US009202266B2

(12) United States Patent
Govindarao et al.

(10) Patent No.: US 9,202,266 B2
(45) Date of Patent: Dec. 1, 2015

(54) METHOD, APPARATUS AND COMPUTER PROGRAM PRODUCT FOR PROCESSING OF IMAGES

(71) Applicant: Nokia Corporation, Espoo (FI)

(72) Inventors: Krishna Annasagar Govindarao, Bangalore (IN); Gururaj Gopal Putraya, Bangalore (IN); Mithun Uliyar, Bangalore (IN); Basavaraja S V, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/138,969

(22) Filed: Dec. 23, 2013

(65) Prior Publication Data

US 2014/0219575 A1    Aug. 7, 2014

(30) Foreign Application Priority Data

Dec. 31, 2012  (IN) ............................. 5554/CHE/2012

(51) Int. Cl.
*G06K 9/40* (2006.01)
*G06T 5/00* (2006.01)
*H04N 5/367* (2011.01)

(52) U.S. Cl.
CPC .............. *G06T 5/005* (2013.01); *H04N 5/3675* (2013.01)

(58) Field of Classification Search
USPC ....................................................... 382/255
See application file for complete search history.

(56) References Cited

U.S. PATENT DOCUMENTS

| 6,665,009 | B1 | 12/2003 | Dong |
| 6,970,194 | B1 | 11/2005 | Smith |
| 7,034,874 | B1 | 4/2006 | Reinhart et al. |
| 8,035,702 | B2 | 10/2011 | Sato et al. |
| 8,130,292 | B2 | 3/2012 | Lee |
| 2006/0204128 | A1* | 9/2006 | Silverstein .................... 382/275 |
| 2006/0256226 | A1* | 11/2006 | Alon et al. .................... 348/335 |
| 2010/0157047 | A1* | 6/2010 | Larkin et al. .................. 348/135 |
| 2010/0283884 | A1 | 11/2010 | Hayasaka et al. |
| 2011/0026910 | A1 | 2/2011 | Liang et al. |
| 2011/0234841 | A1 | 9/2011 | Akeley et al. |
| 2014/0092221 | A1* | 4/2014 | Nagai ............................. 348/51 |

FOREIGN PATENT DOCUMENTS

| EP | 1863272 A1 | 12/2007 |
| EP | 2538242 A1 | 12/2012 |
| JP | 2002359783 A | 12/2002 |
| JP | 2005-142621 A | 6/2005 |
| WO | 2012/063265 A2 | 5/2012 |
| WO | 2012170111 A1 | 12/2012 |

OTHER PUBLICATIONS

European Search Report received for corresponding EP Application No. 13195771.4, dated Apr. 14, 2014, 7 pages.
Acosta et al., "Tuning of Adaptive Weight Depth Map Generation Algorithms", Exploratory Data Analysis and Design of Computer Experiments, Nov. 1, 2011, pp. 1-8.

* cited by examiner

*Primary Examiner* — Yon Couso
(74) *Attorney, Agent, or Firm* — Harrington & Smith

(57) ABSTRACT

In accordance with an example embodiment a method, apparatus and computer program product are provided. The method comprises determining a plurality of first pixels having resemblance with a second pixel associated with an image based on a depth information of the image. The method further comprises replacing the second pixel by at least one first pixel of the plurality of first pixels based on a determination that the at least one first pixel is not associated with the at least one image defect.

20 Claims, 7 Drawing Sheets

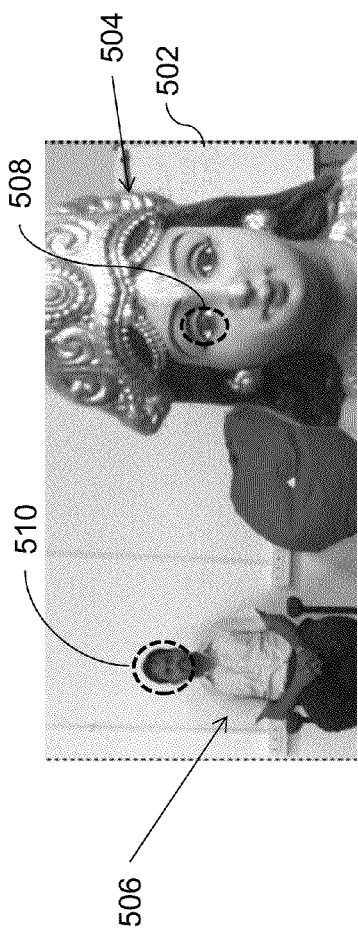
FIGURE 5A
FIGURE 5B
FIGURE 5C

METHOD, APPARATUS AND COMPUTER PROGRAM PRODUCT FOR PROCESSING OF IMAGES

TECHNICAL FIELD

Various implementations relate generally to method, apparatus, and computer program product for processing of images.

BACKGROUND

The rapid advancement in technology related to capturing multimedia content, such as images and videos has resulted in an exponential increase in the creation of image content. Various devices like mobile phones and personal digital assistants (PDA) are being configured with image/video capture capabilities, thereby facilitating easy capture of the multimedia content such as images/videos. The quality of captured images may be affected based on various factors such as lens shading artifacts, quality of image sensors associated with image capturing device, and the like. The captured images may be subjected to processing based on various user needs. For example, images captured corresponding to a scene may be edited or processed to generate quality images that may be devoid of defects such as lens shading defects, bad pixel defects, and the like.

SUMMARY OF SOME EMBODIMENTS

Various aspects of example embodiments are set out in the claims.

In a first aspect, there is provided a method comprising: determining a plurality of first pixels having resemblance with a second pixel associated with an image based on a depth information of the image, the second pixel being associated with at least one image defect; and replacing the second pixel by at least one first pixel of the plurality of first pixels based on a determination that the at least one first pixel is not associated with the at least one image defect.

In a second aspect, there is provided an apparatus comprising at least one processor; and at least one memory comprising computer program code, the at least one memory and the computer program code configured to, with the at least one processor, cause the apparatus to at least perform: determine a plurality of first pixels having resemblance with a second pixel associated with an image based on a depth information of the image, the second pixel being associated with at least one image defect; and replace the second pixel by at least one first pixel of the plurality of first pixels based on a determination that the at least one first pixel is not associated with at least one of the image defect.

In a third aspect, there is provided a computer program product comprising at least one computer-readable storage medium, the computer-readable storage medium comprising a set of instructions, which, when executed by one or more processors, cause an apparatus to at least perform: determine a plurality of first pixels having resemblance with a second pixel associated with an image based on a depth information of the image, the second pixel being associated with at least one image defect; and replace the second pixel by at least one first pixel of the plurality of first pixels based on a determination that the at least one first pixel is not associated with at least one of the image defect.

In a fourth aspect, there is provided an apparatus comprising: means for determining a plurality of first pixels having resemblance with a second pixel associated with an image based on a depth information of the image, the second pixel being associated with at least one image defect; and means for replacing the second pixel by at least one first pixel of the plurality of first pixels based on a determination that the at least one first pixel is not associated with at least one of the image defect.

In a fifth aspect, there is provided a computer program comprising program instructions which when executed by an apparatus, cause the apparatus to: determine a plurality of first pixels having resemblance with a second pixel associated with an image based on a depth information of the image, the second pixel being associated with at least one image defect; and replace the second pixel by at least one first pixel of the plurality of first pixels based on a determination that the at least one first pixel is not associated with at least one of the image defect.

BRIEF DESCRIPTION OF THE FIGURES

Various embodiments are illustrated by way of example, and not by way of limitation, in the figures of the accompanying drawings in which:

FIGS. 5A, 5B and 5C illustrate example image and portions thereof for processing of the image in accordance with an example embodiment;

DETAILED DESCRIPTION

Example embodiments and their potential effects are understood by referring to FIGS. 1 through 7 of the drawings.

Various embodiments relate to processing of images to generate a processed image that may be devoid of image defects such as bad pixel defects and lens shading defects. In an embodiment, the image may be a light-field image. As used herein, the terms 'light-field image' may refer to an infinite collection of vectors representative of the light converging at a point from all possible angles in three dimension (3D). A light-field image is a complete representation of a visual scene and contains all possible views of the scene. The light-field image comprises an angular information, for example, a four dimension (4D) information of all the light rays associated with the scene in 3D. An exemplary light-field image is illustrated with reference to FIG. 1. In an embodiment, the image may be captured by utilizing a light-field image capturing device, such as a plenoptic camera.

Figure 1:
FIG. 1 illustrate an example image in accordance with an example embodiment.

FIG. 1 illustrates an example of a light-field image 102 in accordance with an embodiment. As illustrated herein, the light-field image 102 comprises a 2D image that includes a plurality of small images associated with a scene. The plurality of small images may be termed as an array of "micro-images". In an embodiment, each of the micro-images associated with the scene may comprise depth information associated with the scene. In an embodiment, a device configured to capture the light-field image (for example, a light-field camera) may include an array of micro lenses that enables the light-field camera to record not only image intensity, but also the distribution of intensity in different directions at each point. For generating an image from the light-field image, pixels from multiple micro-images may be selected. An example configuration of a micro-lenses in a device configured to capture a light-field image is illustrated and described in FIG. 4. An example device configured for capturing light-field image along with various components thereof is disclosed in FIG. 3.

Figure 2:
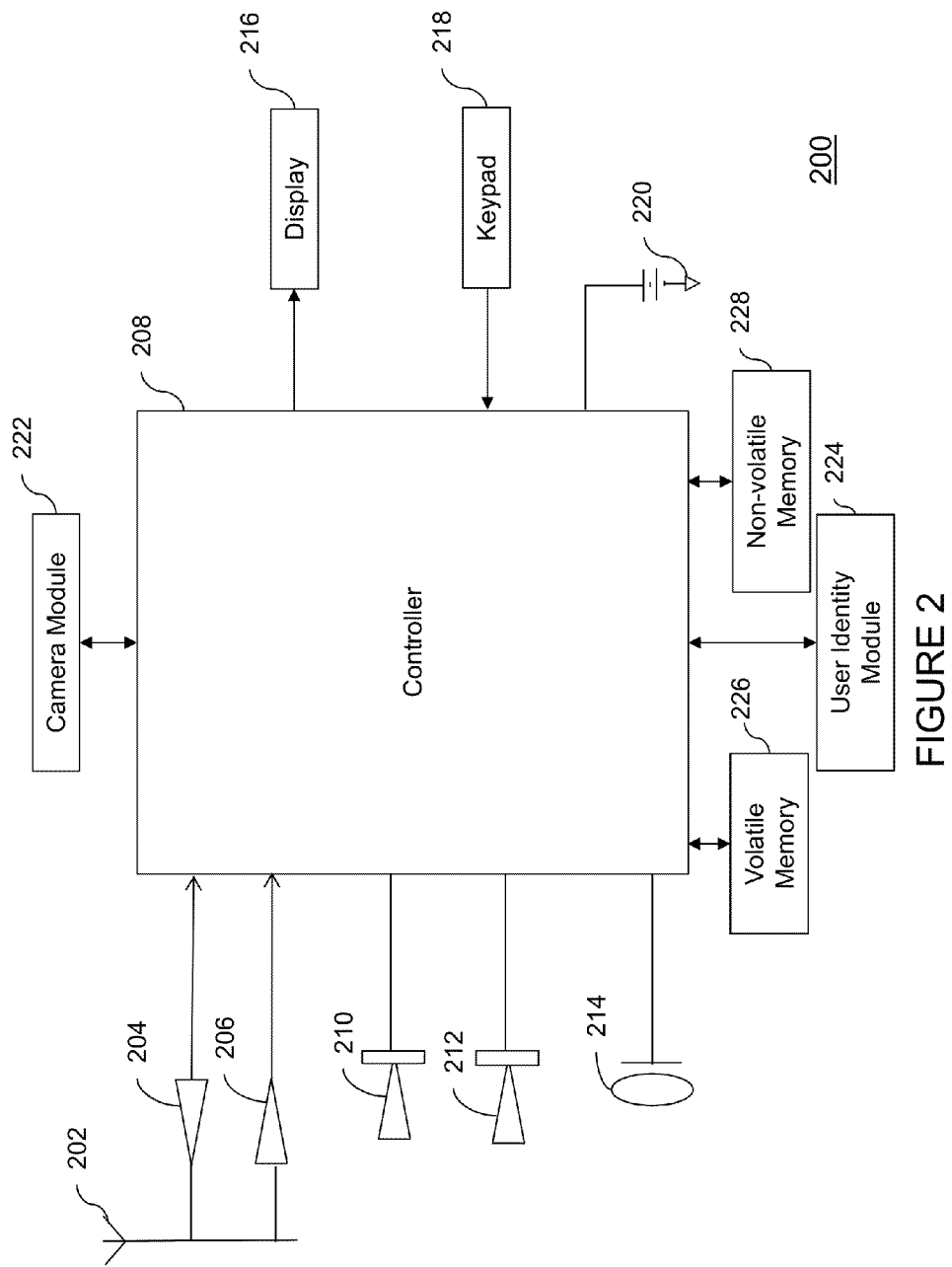
FIG. 2 illustrates a device for processing of images in accordance with an example embodiment.

FIG. 2 illustrates a device 200 in accordance with an example embodiment. It should be understood, however, that the device 200 as illustrated and hereinafter described is merely illustrative of one type of device that may benefit from various embodiments, therefore, should not be taken to limit the scope of the embodiments. As such, it should be appreciated that at least some of the components described below in connection with the device 200 may be optional and thus in an example embodiment may include more, less or different components than those described in connection with the example embodiment of FIG. 1. The device 200 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 200 may include an antenna 202 (or multiple antennas) in operable communication with a transmitter 204 and a receiver 206. The device 200 may further include an apparatus, such as a controller 208 or other processing device that provides signals to and receives signals from the transmitter 204 and receiver 206, respectively. The signals may include signaling information in accordance with the air interface standard of the applicable cellular system, and/or may also include data corresponding to user speech, received data and/or user generated data. In this regard, the device 200 may be capable of operating with one or more air interface standards, communication protocols, modulation types, and access types. By way of illustration, the device 200 may be capable of operating in accordance with any of a number of first, second, third and/or fourth-generation communication protocols or the like. For example, the device 200 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 200 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 208 may include circuitry implementing, among others, audio and logic functions of the device 200. For example, the controller 208 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 200 are allocated between these devices according to their respective capabilities. The controller 208 thus may also include the functionality to convolutionally encode and interleave message and data prior to modulation and transmission. The controller 208 may additionally include an internal voice coder, and may include an internal data modem. Further, the controller 208 may include functionality to operate one or more software programs, which may be stored in a memory. For example, the controller 208 may be capable of operating a connectivity program, such as a conventional Web browser. The connectivity program may then allow the device 200 to transmit and receive Web content, such as location-based content and/or other web page content, according to a Wireless Application Protocol (WAP), Hypertext Transfer Protocol (HTTP) and/or the like. In an example embodiment, the controller 208 may be embodied as a multi-core processor such as a dual or quad core processor. However, any number of processors may be included in the controller 208.

The device 200 may also comprise a user interface including an output device such as a ringer 210, an earphone or speaker 212, a microphone 214, a display 216, and a user input interface, which may be coupled to the controller 208. The user input interface, which allows the device 200 to receive data, may include any of a number of devices allowing the device 200 to receive data, such as a keypad 218, a touch display, a microphone or other input device. In embodiments including the keypad 218, the keypad 218 may include numeric (0-9) and related keys (#, *), and other hard and soft keys used for operating the device 200. Alternatively or additionally, the keypad 218 may include a conventional QWERTY keypad arrangement. The keypad 218 may also include various soft keys with associated functions. In addition, or alternatively, the device 200 may include an interface device such as a joystick or other user input interface. The device 200 further includes a battery 220, such as a vibrating battery pack, for powering various circuits that are used to operate the device 200, as well as optionally providing mechanical vibration as a detectable output.

In an example embodiment, the device 200 includes a media capturing element, such as a camera, video and/or audio module, in communication with the controller 208. The media capturing element may be any means for capturing an image, video and/or audio for storage, display or transmission. In an example embodiment, the media capturing element is a camera module 222 which may include a digital camera capable of forming a digital image file from a captured image. As such, the camera module 222 includes all hardware, such as a lens or other optical component(s), and software for creating a digital image file from a captured image. Alternatively or additionally, the camera module 222 may include the hardware needed to view an image, while a memory device of the device 200 stores instructions for execution by the controller 208 in the form of software to create a digital image file from a captured image. In an example embodiment, the camera module 222 may further include a processing element such as a co-processor, which assists the controller 208 in processing image data and an encoder and/or decoder for compressing and/or decompressing image data. In an embodiment, the processor may be configured to perform processing of the co-processor. For example, the processor may facilitate the co-processor to process the image data and the encoder and/or the decoder. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 222 may provide live image data to the display 216. In an example embodiment, the display 216 may be located on one side of the device 200 and the camera module 222 may include a lens positioned on the opposite side of the device 200 with respect to the display 216 to enable the camera module 222 to capture images on one side of the device 200 and present a view of such images to the user positioned on the other side of the device 200.

The device 200 may further include a user identity module (UIM) 224. The UIM 224 may be a memory device having a processor built in. The UIM 224 may include, for example, a subscriber identity module (SIM), a universal integrated circuit card (UICC), a universal subscriber identity module (USIM), a removable user identity module (R-UIM), or any other smart card. The UIM 224 typically stores information elements related to a mobile subscriber. In addition to the UIM 224, the device 200 may be equipped with memory. For example, the device 200 may include volatile memory 226, such as volatile random access memory (RAM) including a cache area for the temporary storage of data. The device 200 may also include other non-volatile memory 228, which may be embedded and/or may be removable. The non-volatile memory 228 may additionally or alternatively comprise an electrically erasable programmable read only memory (EEPROM), flash memory, hard drive, or the like. The memories may store any number of pieces of information, and data, used by the device 200 to implement the functions of the device 200.

Figure 3:
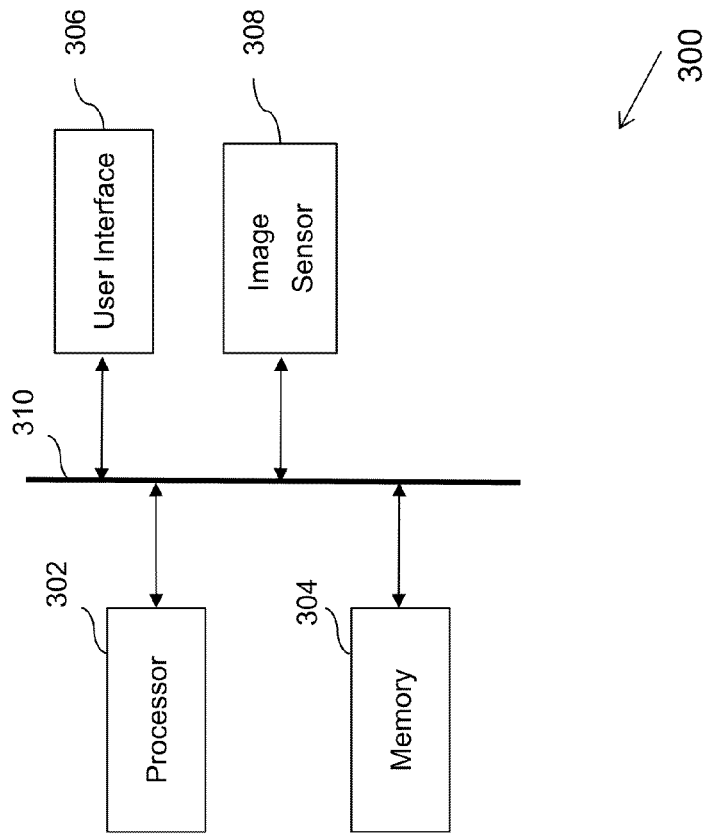
FIG. 3 illustrates an apparatus for processing of images in accordance with an example embodiment.

FIG. 3 illustrates an apparatus 300 for processing of images in accordance with an example embodiment. The apparatus 300 for processing of images may be employed, for example, in the device 200 of FIG. 2. However, it should be noted that the apparatus 300, may also be employed on a variety of other devices both mobile and fixed, and therefore, embodiments should not be limited to application on devices such as the device 200 of FIG. 2. Alternatively, embodiments may be employed on a combination of devices including, for example, those listed above. Accordingly, various embodiments may be embodied wholly at a single device, (for example, the device 200 or in a combination of devices). It should also be noted that the devices or elements described below may not be mandatory and thus some may be omitted in certain embodiments.

The apparatus 300 includes or otherwise is in communication with at least one processor 302 and at least one memory 304. Examples of the at least one memory 304 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 304 may be configured to store information, data, applications, instructions or the like for enabling the apparatus 300 to carry out various functions in accordance with various example embodiments. For example, the memory 304 may be configured to buffer input data comprising multimedia content for processing by the processor 302. Additionally or alternatively, the memory 304 may be configured to store instructions for execution by the processor 302.

An example of the processor 302 may include the controller 208. The processor 302 may be embodied in a number of different ways. The processor 302 may be embodied as a multi-core processor, a single core processor; or combination of multi-core processors and single core processors. For example, the processor 302 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity, for example, physically embodied in circuitry, capable of performing operations according to various embodiments while configured accordingly. For example, if the processor 302 is embodied as two or more of an ASIC, FPGA or the like, the processor 302 may be specifically configured hardware for conducting the operations described herein. Alternatively, as another example, if the processor 302 is embodied as an executor of software instructions, the instructions may specifically configure the processor 302 to perform the algorithms and/or operations described herein when the instructions are executed. However, in some cases, the processor 302 may be a processor of a specific device, for example, a mobile terminal or network device adapted for employing embodiments by further configuration of the processor 302 by instructions for performing the algorithms and/or operations described herein. The processor 302 may include, among other things, a clock, an arithmetic logic unit (ALU) and logic gates configured to support operation of the processor 302.

A user interface 306 may be in communication with the processor 302. Examples of the user interface 306 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 306 may include, among other devices or elements, any or all of a speaker, a microphone, a display, and a keyboard, touch screen, or the like. In this regard, for example, the processor 302 may comprise user interface circuitry configured to control at least some functions of one or more elements of the user interface 306, such as, for example, a speaker, ringer, microphone, display, and/or the like. The processor 302 and/or user interface circuitry comprising the processor 302 may be configured to control one or more functions of one or more elements of the user interface 306 through computer program instructions, for example, software and/or firmware, stored on a memory, for example, the at least one memory 304, and/or the like, accessible to the processor 302.

In an example embodiment, the apparatus 300 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 306, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device. The display and display circuitry may be configured to facilitate the user to control at least one function of the communication device.

In an example embodiment, the communication device may be embodied as to include a transceiver. The transceiver may be any device operating or circuitry operating in accordance with software or otherwise embodied in hardware or a combination of hardware and software. For example, the processor 302 operating under software control, or the processor 302 embodied as an ASIC or FPGA specifically configured to perform the operations described herein, or a combination thereof, thereby configures the apparatus or circuitry to perform the functions of the transceiver. The transceiver may be configured to receive multimedia content. Examples of multimedia content may include audio content, video content, data, and a combination thereof.

In an example embodiment, the communication device may be embodied as to include an image sensor, such as an image sensor 308. The image sensor 308 may be in communication with the processor 302 and/or other components of the apparatus 300. The image sensor 308 may be in communication with other imaging circuitries and/or software, and is configured to capture digital images or to make a video or other graphic media files. The image sensor 308 and other circuitries, in combination, may be an example of the camera module 222 of the device 200.

The components 302-308 may communicate with each other via a centralized circuit system 310 to perform generation of the processed multimedia content. The centralized circuit system 310 may be various devices configured to, among other things, provide or enable communication between the components 302-308 of the apparatus 300. In certain embodiments, the centralized circuit system 310 may be a central printed circuit board (PCB) such as a motherboard, main board, system board, or logic board. The centralized circuit system 310 may also, or alternatively, include other printed circuit assemblies (PCAs) or communication channel media.

In an example embodiment, the processor 302 is caused to, with the content of the memory 304, and optionally with other components described herein, to cause the apparatus 300 to process an image associated with a scene. In an embodiment, the image may be pre-recorded and stored in the apparatus 300. In another embodiment, the image may be captured by utilizing the camera module 222 of the device 200, and stored in the memory of the device 200. In yet another embodiment, the device 200 may receive the image from internal memory such as hard drive, random access memory (RAM) of the apparatus 300, or from external storage medium such as digital versatile disk, compact disk, flash drive, memory card, or from external storage locations through Internet, Bluetooth®, and the like. The apparatus 300 may also receive the image from the memory 304.

In an embodiment, the image may be a light-field image. As discussed with reference to FIG. 1, the term light-field image' may refer to an infinite collection of vectors representative of the light converging at a point from all possible angles in 3D. In an embodiment, the image may include a plurality of pixels. In an embodiment, the image may be captured by utilizing a light-field image capturing device, for example, a light-field camera. An example of the light-field image capturing device may be a plenoptic camera.

In order to get a high resolution output, the sensors associated with the light-field camera are of higher resolution. As such, for generating images with less pixel defects, the sensor yields may be lower thereby increasing the overall cost associated with the light-field camera. The disclosed methods and apparatus may be utilized for correcting image defects such as bad pixel defects and vignette defects, thereby facilitating in increasing the yield and reducing the cost associated with the light-field camera. In an embodiment, the bad pixel defects may also include cluster defects, row/column defects, and the like associated with the images. As used herein, 'cluster defects' may refer to a cluster of bad pixels, for example, n×m consecutive pixels that may be bad. In addition, row/column defects refer to bad pixels wherein a complete row/column of the sensors comprises of bad pixels. Since light-field cameras are capable of providing multiple similar pixels having resemblance to each other corresponding to every scene point, thus for correcting defects such as cluster defects, row/column defects, the multiple resembling pixels associated with a scene point may be exploited. The multiple similar pixels having resemblance to each other may hereinafter be referred to as 'resembling pixels'. In an embodiment, the terms such as 'similar pixels' or 'pixels having resemblance' may be construed as referring to the pixels that may correspond to the same portion of the image, but casted under different micro-lens. Accordingly, in some embodiments, the similar pixels or the resembling pixels may be associated with substantially same intensity values. In some embodiments, the plurality of first pixels may be replica of the second pixel, without at least one image defect in the second pixel, and may be referred to as 'replica pixels'. In an example embodiment, the intensity values of the resembling pixels may be derived from the immediate spatial neighborhood (under the same micro-lens) as well as from neighboring micro-lens (where the same view is likely to be repeated). Thus, the derived intensity values associated with the resembling pixels may be utilized for correcting the image defects associated with the light-field images.

In an embodiment, a determination of the resembling pixel in a light-field image may depend on the depth estimation of every pixel in the captured light-field image. In an embodiment, multiple resembling pixels of a scene point under various micro-lenses may be utilized for robustly estimating the depth of each pixel in the captured light-field image, thereby reliably determining the pixel to be replaced from the neighboring micro-lenses for a defective (for example, bad) pixel in the current micro-lens.

In an embodiment, the processor 302 is caused to, with the content of the memory 304, and optionally with other components described herein, to cause the apparatus 300 to determine a plurality of first pixels of the plurality of pixels having resemblance with a second pixel. In an embodiment, the second pixel may be associated with at least one image defect. In some embodiments, the at least one image defect may include at least one of a vignette pixel and a bad pixel. In an embodiment, determining the first pixel being the bad pixel comprises determining those pixels that do not perform as expected. For example, the pixel may appear as a black spot or a white spot in the image. Various examples of bad pixels include stuck high pixel, stuck low pixel, hot pixel, cold pixel, a pixel from a group of bad pixels forming a cluster, a pixel from a group of bad pixels forming along a row or a column. The term 'stuck pixel' may be construed as referring to a pixel that may appear as a bright dot of color that is most evident when rest of the image is black. A stuck pixel reads high on all photos taken, regardless of an exposure time. The term 'hot pixel' may refer to pixels associated with individual sensors on a CCD sensor of a camera that have higher than normal rates of charge leakage, thereby causing them to appear as small pixel-sized bright points of light in images. In other word, a hot pixel is a pixel that reads high (i.e., appears very bright) on long exposures, for example, night-time scenes.

In an embodiment, the bad pixels may be determined based on the pixel intensities of the resembling pixels of the first pixel that are casted under different (for example, neighboring) micro-lenses. For example, while traversing (for example, in a from one micro-lens towards another, if there is a spike in a value of the pixel intensity associated with the same pixel casted under different micro-lenses, then it may be determined that the pixel is bad pixel. In another embodiment, a pixel intensity value associated with other neighboring pixels casted under the same micro-lens may be determined. If it is determined, that there is a substantial difference between the intensity values of a pixel as compared to the rest of the pixels casted under the same micro-lens, then the pixel may be determined to be a bad pixel.

In an embodiment, determining the second pixel being the vignette pixel comprises determining a pixel associated with a low intensity as compared to an expected intensity. In particular, the vignette pixel may be determined by performing determination of pixel intensity of pixels appearing at an edge portion of an image. For instance, on traversing in a radial direction in an image (for example, on moving from central portion towards the edges/corners of an image), the intensity of pixels may reduce. The phenomenon of this radial drop in intensity on moving from the central portion towards the edges/corners of the image sensor may be termed as a 'lens shading phenomenon', and the pixels associated with the lens shading phenomenon may be termed as vignette pixels. As a result of lens shading phenomenon, the captured image may be bright and well-illuminated at the center and the illumination drops off near the edges of the field-of-view of the image.

In an embodiment, the image may include an angular information associated with the scene that may be utilized in determining a depth map of the scene. As used herein, the 'depth map' may be construed as referring to a map illustrating distance between objects of an image. Additionally, the pixels of the image may be represented by numerical integer values on the depth map. In embodiment, the depth map of the scene may be generated based on a determination of feature points associated with the scene. Examples of the feature points may include, but are not limited to, corners, edges of an image, or other regions of interest such as background region of the scene. In an example embodiment, the apparatus 300 is caused to generate a 3-D image of the scene based on the depth map. In an embodiment, the processor 302 is caused to, with the content of the memory 304, and optionally with other components described herein, to cause the apparatus 300 to determine the depth map of the image.

In an embodiment, the processor 302 is configured to, with the content of the memory 304, and optionally with other components described herein, to cause the apparatus 300 to determine the plurality of first pixels based on a depth information of the plurality of pixels. The plurality of first pixels comprises first pixels having resemblance with the second pixel. In other words, each first pixel of the plurality of first pixels comprises an image of same portion of the scene casted under different micro-lenses of the image capturing device. For example, the scene may depict an image of a person, and various micro-lenses of the image capturing device may capture/cast the image of person from different orientations. Accordingly, the same point or portion of a scene casted under or captured by different micro-lenses may be associated with a different co-ordinate position. A difference between such co-ordinate positions associated with the same pixel casted under different micro-lenses may be termed as a 'depth offset' or a shift or a disparity, and may be determined based on the depth information associated with the image/scene. In an embodiment, the depth offset may be associated with a depth of the image. For example, an image of an object captured in such a manner that the object is placed closer to the image capturing device may have a higher depth offset as compared to the object placed farther from the image capturing device.

In an embodiment, the processor 302 is configured to, with the content of the memory 304, and optionally with other components described herein, to cause the apparatus 300 to determine whether at least one first pixel of the plurality of first pixels is associated with the image defect. In an embodiment, determination whether the at least one first pixel is associated with the image defect comprises determining whether the at least one pixel is the vignette pixel or the bad pixel. In an embodiment, if it is determined that the at least one first pixel of the plurality of pixels is not a bad pixel, then the processor 302 is configured to, with the content of the memory 304, and optionally with other components described herein, to cause the apparatus 300 to replace the second pixel by the at least one first pixel of the plurality of first pixels. In an embodiment, replacing the second pixel with at least one first pixel may be construed as referring to replacing the pixel intensity of the second pixel with (combined or individual) pixel intensities of the at least one second pixel. For example, if it is determined that out of eight first pixels, two first pixels are not bad pixels while rest of six pixels are bad pixels, then a function of pixel intensity of the two pixel intensities (of two first pixels which are not bad pixels) is computed, and the pixel intensity of the second pixel may be replaced with the computed function of pixel intensities of the two first pixels. In an embodiment, the function may refer to arithmetic functions such as median, mode, average or any other operator that may be utilized for determination of a combined or consolidated value of the pixel intensity associated with the at least one first pixels. In another embodiment, instead of replacing the pixel intensity of the second pixel with the function of pixel intensities of the two first pixels, the pixel intensity of the second pixel may be replaced with the pixel intensity of one of the two first pixels that is located at a central portion of the image. For example, the co-ordinates for the second pixel may be at a point A (12.5, 12.5) under one micro-lens, and the same pixel may be at co-ordinates B (15, 15) and C (17.5, 17.5) under two of the neighboring micro-lenses, then, out of the two first pixels at co-ordinates B and C respectively, the pixel at co-ordinate B may be selected for replacing the first pixel if the co-ordinate B corresponds to a central portion of the image. In an embodiment, if it is determined that all of the plurality of first pixels are either a bad pixel or a vignette pixel, then the second pixel may be replaced by using an 'interpolation technique'. The interpolation technique comprises interpolating pixel values from neighboring pixel values of the current micro-lens, to thereby generate pixel values for current pixels.

In some example embodiments, an apparatus such as the apparatus 300 may comprise various components such as means for determining a plurality of first pixels having resemblance with a second pixel associated with an image based on a depth information of the image, the second pixel being associated with at least one image defect; and replacing the second pixel by at least one first pixel of the plurality of first pixels based on a determination that the at least one first pixel is not associated with the at least one image defect. Such components may be configured by utilizing hardware, firmware and software components. Examples of such means may include, but are not limited to, the processor 302 along with the memory 304, the UI 306, and the image sensor 308.

In an example embodiment, means for determining the second pixel associated with the vignette pixel comprises means for performing determination of pixel intensity of pixels appearing at an edge portion of the image. In an example embodiment, means for replacing the second pixel by at least one first pixel comprises replacing a value of pixel intensity of the second pixel with a value of pixel intensity of the at least one first pixel. In another embodiment, means for replacing the first pixel by at least one first pixel comprises means for replacing a value of pixel intensity of the second pixel with a function value of pixel intensities of the at least one pixel. In an embodiment, the function value may refer to value of pixel intensity computed based on arithmetic functions such as median, mode, average or any other operator that may be utilized for determination of a consolidated value of the pixel intensity associated with the at least one first pixels. In yet another embodiment, means for replacing the first pixel by at least one first pixel comprises means for replacing a value of pixel intensity of the second pixel with a value of pixel intensity of a pixel located at a central portion of the image. Examples of such means may include, but are not limited to, the processor 302 along with the memory 304, the UI 306, and the image sensor 308. Some embodiments of processing multimedia content are further described in FIGS. 4 to 7.

Figure 4:
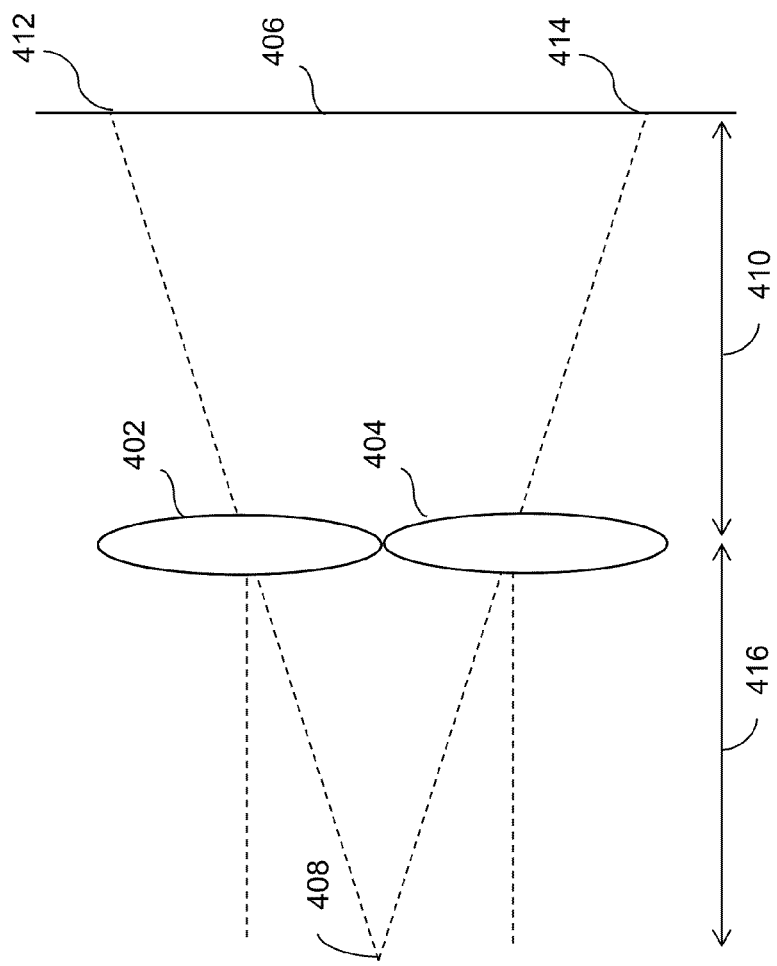
FIG. 4 illustrate example configuration of a device for capturing the image in accordance with example embodiments.

FIG. 4 illustrates example configuration of a device 400, in accordance with an embodiment. In an embodiment, the device 400 is configured to capture a light-field image. The device 400 may include an array of micro-lenses comprising, for example, a micro-lens 402 and a micro-lens 404, and an image sensor 406. The array of micro lenses are configured to create a map of light intensity for an object, for example, an object located at point 408 in the image at an image plane of the main lens. In an embodiment, the array of micro lenses may be configured at a distance (represented as 410) from the image sensor 406. In an embodiment, the image sensor 406 may be a charge-coupled device (CCD). In an embodiment, the rays of light may be incident at the optical element, thereby generating an image, for example, images 412, 414 at an image plane at a focal distance from the optical element.

Each micro-lens may split a beam coming towards it from the optical element into rays coming from different "pinhole" locations on the aperture of the optical element. Each of the rays may be recorded as a pixel on the image sensor 416, and the pixels under each micro-lens may collectively form an n-pixel image. The n-pixel region under each array of lens may be referred to as a macro-pixel, and the device may generate a micro-image at each macro-pixel. The light-field image captured by the device may generated a plurality of micro-images of a scene. An exemplary light-field image is illustrated and described in FIG. 1. In an embodiment, the light-field image may be processed for generating an image that is devoid of image defects such as lens shading defects and pixel defects. In an embodiment, the depth offset associated with the micro-lens may be computed based on the following expression:

$$P'=P+(1-(B/v))D \qquad (1)$$

where,

D is the distance between adjacent micro-lenses, for example micro-lenses 402, 404.

p is the scene point (shown as 408 in FIG. 4) imaged by the main-lens in front of the micro-lens.

v is the distance (shown as 416 in FIG. 4) between the imaged scene point 408 and the micro-lens array (comprising micro-lenses 402, 404). The imaged scene point depends on the depth at which the point is present in front of the image capturing device. Hence, the distance 'v' depends on the depth of the scene.

B is the distance (shown as 410 in FIG. 4) between the micro-lens array and the sensor.

P is the pixel location (shown as 412 in FIG. 4) where the scene point 'p' is imaged for top micro-lens 402 (assuming pin-hole imaging).

P' is the pixel location (shown as 414 in FIG. 4) where the scene point 'p' is imaged for bottom micro-lens 404 (assuming pin-hole imaging).

From equation (1), if the depth (i.e., 'v') of the scene point is known, then a resembling pixel of the pixel location under different micro-lenses may be determined, which may be utilized for performing correction of bad pixel defects.

FIGS. 5A, 5B and 5C illustrate an example image 502 and portions thereof, for example a portion 504 and 506, for processing of the image 502 in accordance with an embodiment. As explained with reference to FIG. 1, the image 502 may be a light-field image (for example, the light-field image 102 illustrated in FIG. 1). FIGS. 5B and 5C illustrate portions 504 and 506, respectively of the image 502. In the example image 502 illustrated in FIG. 5A, the image 502 is shown to include portions such as a statue 504 and a person 506, such that the statue 504 is closer to image capturing device as compared to the person 506. As already discussed with reference to FIG. 3, the closer the object is placed to the image capturing device, more would be the number of resembling pixels associated with an object in the neighbouring/surrounding micro-lenses. For example, as illustrated in FIGS. 5B and 5C, the resembling (or replica) pixels of the pixels associated with an eye portion 508 of the statue 504 in neighbouring micro-lenses is more than the replicas of pixels associated with the face portion 510 of the person 506. Accordingly, an image captured from a closer location may include more number of resembling pixels as compared to an image captured from a farther location/distance from the image capturing device. A method for processing of images, for example the image 502 is described in detail with reference to FIG. 6.

Figure 6:
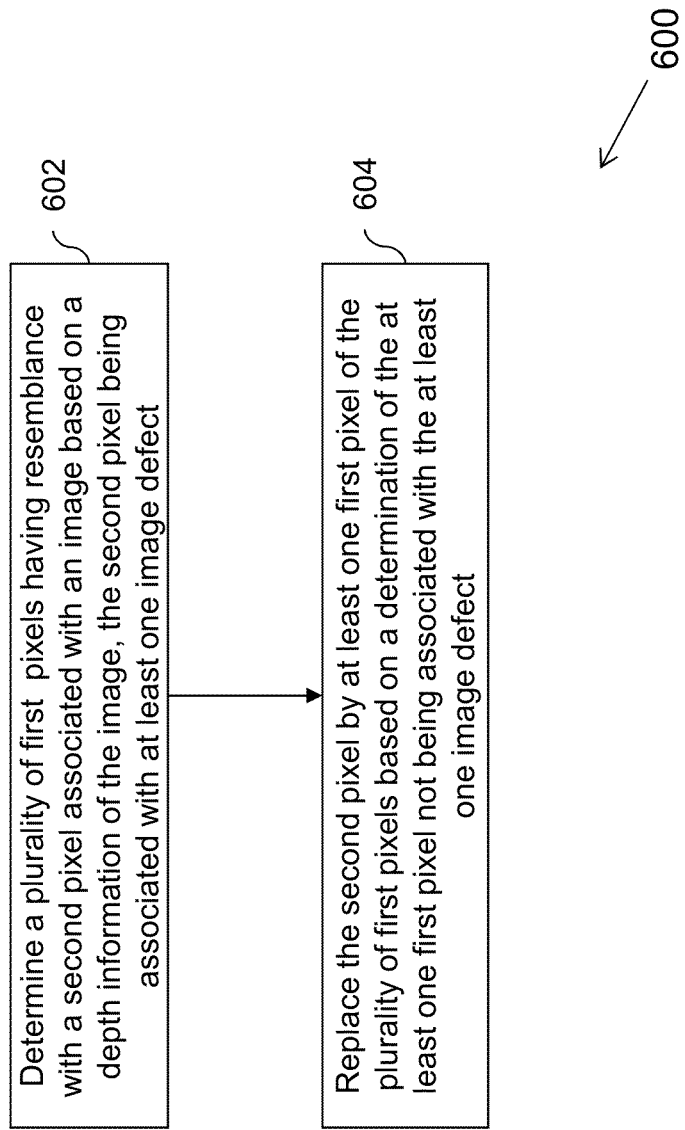
FIG. 6 illustrates a flowchart depicting an example method for processing of images in accordance with an example embodiment.

FIG. 6 is a flowchart depicting an example method 600 for processing of images, in accordance with an example embodiment. The method depicted in the flow chart may be executed by, for example, the apparatus 300 of FIG. 3. It may be understood that for describing the method 600, references herein may be made to FIGS. 1 through 5C. In some embodiments, the image may be generated by processing portions of the image utilizing a light-field image. In an embodiment, the image may be a light-field image. The light-field image comprises an angular information, for example, a four dimension (4D) information of all the light rays associated with a scene in 3D. An exemplary light-field image is illustrated with reference to FIG. 1. In some embodiments, the images may be captured by an image capturing device, or may be retrieved from a memory of a device, for example, the device 200 (refer to FIG. 2) for processing of the image. In an embodiment, the image may be captured by a light-field image capturing device. An example of the light-field image capturing device may include a plenoptic camera.

In an embodiment, the image includes a plurality of pixels. In an embodiment, from among the plurality of pixels, a second pixel being at least one of a vignette pixel and a bad pixel may be determined. In an embodiment, determining the second pixel associated with the vignette pixel comprises performing determination of pixel intensity of pixels appearing at an edge portion of an image. For example, the intensity of pixels on traversing in a radial direction while moving from central portion of an image towards the edge/corner portions of an image sensor may show a reduction in an intensity of pixels, thereby showing bright and well-illuminated image at the central portion, and ill-illuminated image near the edges of the image. The phenomenon of this radial drop in intensity may be termed as a 'lens shading phenomenon'.

In an embodiment, determining the second pixel being the bad pixel may be performed based on the pixel intensities of the pixels having resemblance with the second pixel that are casted under different (for example, neighboring) micro-lenses. For example, while traversing from one micro-lens towards another, if there is a spike in a value of the pixel intensity associated with the same pixel (under different micro-lenses), then a pixel value associated with other neighboring pixels may be determined. In an embodiment, a bad pixel may refer to a pixel that that does not perform as expected. For example, the pixel may appear as a black spot or a white spot in the image.

At block 602 of method 600, a plurality of first pixels of the plurality of pixels may be determined, wherein the plurality of first pixels includes resembling pixels of the second pixel. In other words, each first pixel of the plurality of first pixels comprises an image of same portion of the scene casted under different micro-lenses of the image capturing device. For example, the scene may depict a person, and various micro-lenses of the image capturing device may capture/cast the image of person from different orientations. Accordingly, the same point or portion of a scene casted under or captured by different micro-lenses may be associated with a different co-ordinate position. A difference between such co-ordinate positions associated with a same pixel in different micro-lenses may be termed as a 'depth offset' or a shift or disparity, and may be determined based on the depth information associated with the image/scene. The depth information may be generated based on a depth map of the scene. In various embodiments, the depth map may be estimated by utilizing various algorithms. In an example embodiment, a correlation across different pixels under two micro-lenses may be utilized for estimating the disparity or the depth-offset.

At block 604, the second pixel may be replaced by at least one first pixel of the plurality of first pixels based at least on a determination of the at least one first pixel not being associated with the image defect. In an embodiment, the determination of the at least one first pixel not being associated with the image defect comprises determining that the at least one first pixel is not associated with at least one of the vignette pixel and the bad pixel. In an embodiment, replacing the second pixel with at least one first pixel may be construed as referring to replacing the pixel intensity of the second pixel with (combined or individual) pixel intensities of the at least one first pixel. In an example embodiment, the pixel intensity of the second pixel may be replaced with a function value of pixel intensities of the at least one first pixel. In an embodiment, the function value may refer to a value of one of the arithmetic functions such as median, mode, average or any other operator that may be utilized for determination of a consolidated value of the pixel intensity associated with the at least one first pixels. In another embodiment, instead of replacing the pixel intensity of the second pixel with the function of pixel intensities of the at least one first pixel, the pixel intensity of the first pixel may be replaced with the pixel intensity of one of the two first pixels which is located at a central portion of the image. In an embodiment, if it is determined that all of the plurality of first pixels are either a bad pixel or a vignette pixel or both, the second pixel may be replaced by using an 'interpolation technique'. The interpolation technique comprises interpolating pixel values from neighboring pixels of the current micro-lens to thereby generate pixel values for current pixels.

In an example embodiment, a processing means may be configured to perform some or all of: determining a plurality of first pixels of the plurality of pixels based on a depth information of an image, the plurality of first pixels having resemblance with the second pixel, the second pixel being associated with at least one image defect; and replacing the second pixel by at least one first pixel of the plurality of first pixels based at least on a determination of the at least one first pixel not being associated with the at least one image defect. An example of the processing means may include the processor 302, which may be an example of the controller 208. Another method for generating a processed image is explained in detail with reference to FIG. 7.

Figure 7:
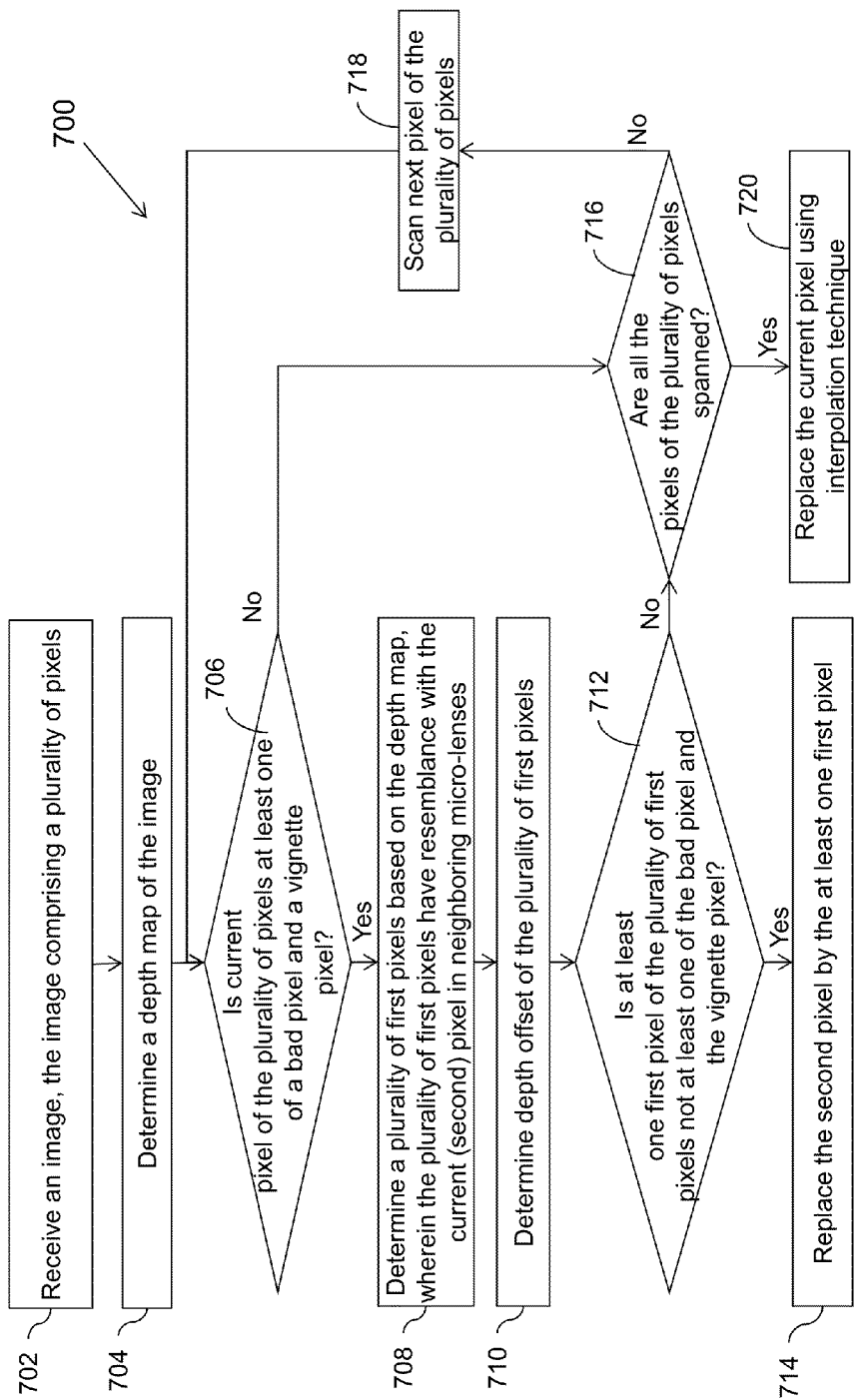
FIG. 7 illustrates a flowchart depicting an example method for processing of images in accordance with another example embodiment.

FIG. 7 illustrates a flowchart depicting an example method 700 for processing of images, in accordance with another example embodiment. In an embodiment, the image herein may be construed as referring to a light-field image. The method 700 depicted in flow chart may be executed by, for example, the apparatus 300 of FIG. 3. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 700 are described with help of apparatus 300. However, the operations of the method can be described and/or practiced by using any other apparatus.

Referring now to FIG. 7, at block 702, the method 700 includes receiving an image having a plurality of pixels. In an embodiment, the image is a light-field image. The light-field image comprises an angular information, for example, a four dimension (4D) information of all the light rays associated with a scene in 3D. An exemplary light field image is illustrated with reference to FIG. 1. In an embodiment, the image may be captured by a light-field image capturing device such as a plenoptic camera. In an embodiment, an array of micro-lenses configured in the light-field image capturing device may facilitate in capturing the light-field image. Capturing of a light-field image is explained with reference to FIG. 4.

At block 704, a depth map associated with a scene depicted in the image may be generated based on an angular information of the scene. The depth map may refer to a map of relative distances between the various objects associated with the scene. In an embodiment, the depth map may be generated by utilizing the feature points associated with a scene depicted in the image. In an embodiment, the examples of the feature points may include, but are not limited to, corners, edges of the image, or other region of interest such as background of the scene.

In an embodiment, the plurality of pixels may be spanned one by one for the purpose of processing. At block 706, it is determined whether a current pixel, for example, a second pixel of the plurality of pixels is at least one of a bad pixel and a vignette pixel. In an embodiment, a bad pixel may refer to a pixel that does not perform as expected. For example, the bad pixel may appear as a black spot or a white spot in the image. Various examples of bad pixels include stuck high pixel, stuck low pixel, hot pixel and cold pixel. Various other examples of bad pixels may include bad pixels that may form a part of a group/cluster of bad pixels, or a group of bad pixels arranges in a row or a column. In an embodiment, determining the second pixel associated with the vignette pixel comprises performing determination of pixel intensity of pixels appearing at an edge portion of an image. For example, the intensity of pixels on traversing in a radial direction, for example moving from center towards the edges/corners of an image sensor, may reduce an intensity of pixels (as compared to an expected intensity). The phenomenon of this radial drop in intensity may be termed as a 'lens shading phenomenon'. As a result of lens shading phenomenon, the captured image may be bright and well-illuminated at the central portions and the illumination drops off near the edges of the field-of-view of the image.

In an embodiment, the bad pixel may be determined based on the pixel intensities of the pixels having resemblance with the second pixel that are casted under different (for example, neighboring) micro-lenses and those having comparable depth-offsets as that of the second pixel. For example, while traversing from one of the micro-lenses towards other, if there is a spike in a value of the pixel intensity associated with the same pixel (under different micro-lenses), then a pixel value associated with other neighboring pixels may be determined. If it is determined, that there is a difference between the intensity values of said pixel as compared to the pixels values in the neighboring micro-lenses, then the pixel may be determined to be a bad pixel.

If it is determined at block 706 that the current pixel is at least one of a bad pixel or a vignette pixel, then at block 708, at least one first pixels of the plurality of first pixels that are having resemblance with the current pixel (for example, the second pixel) in neighboring micro-lens are determined. In an embodiment, the at least one first pixel is determined based on the depth map as the associated first pixels should have the same depth-offset as the current pixel. At block 710, a depth information associated with the plurality of first pixels is determined. The depth information may include a depth offset of the first pixel with respect to the current pixel in the neighboring micro-lenses.

At block 712, it is determined whether or not at least one first pixel of the plurality of first pixels is a bad pixel or a vignette pixel. If it is determined at block 712 that at least one first pixel is not a bad pixel or vignette pixel, then the current pixel is replaced with the at least one first pixel at block 714. In an embodiment, replacing the second pixel with at least one first pixel may be construed as referring to replacing the pixel intensity of the second pixel with (combined or individual) pixel intensities of the at least one first pixel. If however, it is determined at block 712 that all of the at least one first pixels are either a bad pixel or vignette pixel, then at block 716, it is determined whether all of the plurality of first pixels are spanned. If it is determined that all of the plurality of second pixels are spanned, then at block 718, the current pixel (for example, the second pixel) is replaced by using interpolation technique. If however, at block 716 it is determined that not all the pixels of the plurality of pixels are spanned, then at block 718 a pixel next to the current pixel is spanned and processing of the next pixel is performed upon a determination that the next pixel is at least one of a bad pixel and a vignette pixel (for example, by following blocks 706 through 720).

To facilitate discussion of the method 700 of FIG. 7, certain operations are described herein as constituting distinct steps performed in a certain order. Such implementations are exemplary and non-limiting. Certain operations may be grouped together and performed in a single operation, and certain operations can be performed in an order that differs from the order employed in the examples set forth herein. Moreover, certain operations of the method 700 are performed in an automated fashion. These operations involve substantially no interaction with the user. Other operations of the method 700 may be performed in a manual fashion or semi-automatic fashion. These operations involve interaction with the user via one or more user interface presentations. Various examples for generation of processed images based on the methods (such as methods 600 and 700) and devices disclosed herein are described with reference to FIGS. 6 and 7.

Without in any way limiting the scope, interpretation, or application of the claims appearing below, a technical effect of one or more of the example embodiments disclosed herein is to processing of images. The disclosed embodiments facilitates in generating images from light field images that are devoid of defects such as lens shading defects and bad pixel defects. For example, various embodiments facilitate in generating light-field images of a scene, and utilize resembling pixels of image points casted under different micro-lenses of the light field camera for generating defect-free images. For example, various embodiments disclose generation of images devoid of lens shading defects by determining pixels associated with lens shading defect, and replacing such pixels with a most centrally located resembling pixel. In another example, generation of images of devoid bad pixel defects is disclosed, wherein pixels comprising bad pixel defects are identified and replaced with one or more resembling pixels casted under neighboring micro-lenses. In various embodiments, the resembling pixels may be determined based on a depth information associated with the image. The disclosed methods and devices have the advantage that the defects such as cluster defects associated with the images maybe corrected in an effective manner, thereby resulting in a cost saving for the sensor manufacturers. Moreover, the disclosed methods may be utilized for detection of bad pixels and vignette pixels (those associated with low intensity as compared to an expected intensity) at the time of manufacture or in a laboratory by a calibration procedure, for example, by exposing the camera to a flat field of known luminance.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 2 and/or 3. A computer-readable medium may comprise a computer-readable storage medium that may be any media or means that can contain or store the instructions for use by or in connection with an instruction execution system, apparatus, or device, such as a computer. In one example embodiment, the computer readable medium may be non-transitory.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

We claim:

1. A method comprising:
    determining a plurality of first pixels having resemblance with a second pixel associated with an image based on a depth information of the image, the second pixel being associated with at least one image defect; and
    replacing the second pixel by one first pixel of the plurality of first pixels based on a determination that the at least one first pixel is not associated with the at least one image defect;
    wherein the depth information comprises a depth offset of the at least one first pixel with respect to the second pixel, and wherein the depth offset is associated with at least two micro-lenses of an apparatus.

2. The method as claimed in claim 1, further comprising determining the second pixel of a plurality of pixels associated with the image as being associated with the at least one image defect.

3. The method as claimed in claim 1, wherein the at least one image defect is associated with at least one of a vignette pixel and a bad pixel in the image.

4. The method as claimed in claim 1, wherein the at least one image defect is associated with at least one of a vignette pixel and a bad pixel in the image, wherein determining the first pixel as being the vignette pixel comprises performing determination of intensity of pixels appearing at an edge portion of the image.

5. The method as claimed in claim 1, wherein the at least one image defect is associated with at least one of a vignette pixel and a bad pixel in the image, wherein determining the second pixel as being the bad pixel comprises determining the second pixel as at least one of a stuck high pixel, a stuck low pixel, a hot pixel, a cold pixel, a pixel from a group of bad pixels forming a cluster, and a pixel from a group of bad pixels forming a row or a column in the image.

6. The method as claimed in claim 1, wherein replacing the second pixel by the at least one first pixel comprises one of:
    replacing a value of intensity of the second pixel with a value of intensity of the at least one first pixel;
    replacing a value of intensity of the second pixel with a value of a function of intensities of the at least one first pixel; and
    replacing a value of pixel intensity of the second pixel with a value of pixel intensity of a first pixel located at a central portion of the image.

7. An apparatus comprising:
    at least one processor; and
    at least one memory comprising computer program code, the at least one memory and the computer program code configured to, with the at least one processor, cause the apparatus to at least perform:
    determine a plurality of first pixels having resemblance with a second pixel associated with an image based on a depth information of the image, the second pixel being associated with at least one image defect; and
    replace the second pixel by one first pixel of the plurality of first pixels based on a determination that the at least one first pixel is not associated with the at least one image defect;
    wherein the depth information comprises a depth offset of the at least one first pixel with respect to the second pixel, and wherein the depth offset is associated with at least two micro-lenses of the apparatus.

8. The apparatus as claimed in claim 7, wherein the apparatus is further caused, at least in part to determine the second pixel of a plurality of pixels associated with the image as being associated with the at least one image defect.

9. The apparatus as claimed in claim 7, wherein the at least one image defect is associated with at least one of a vignette pixel and a bad pixel in the image.

10. The apparatus as claimed in claim 7, wherein the at least one image defect is associated with at least one of a vignette pixel and a bad pixel in the image, wherein the apparatus is further caused, at least in part to determine the second pixel as being the vignette pixel by performing determination of intensity of pixels appearing at an edge portion of the image.

11. The apparatus as claimed in claim 7, wherein the at least one image defect is associated with at least one of a vignette pixel and a bad pixel in the image, wherein the apparatus is further caused, at least in part to determine the second pixel as being the bad pixel by determining the second pixel as at least one of a stuck high pixel, a stuck low pixel, a hot pixel, cold pixel, a pixel from a group of bad pixels forming a cluster, and a pixel from a group of bad pixels forming a row or a column in the image.

12. The apparatus as claimed in claim 7, wherein the apparatus is further caused, at least in part to replace the second pixel by the at least one first pixel by performing one of:
- replace a value of intensity of the second pixel with a value of intensity of the at least one first pixel;
- replace a value of intensity of the second pixel with a value of a function of intensities of the at least one first pixel;
- replace a value of pixel intensity of the second pixel with a value of intensity of a first pixel located at a central portion of the image.

13. A computer program product comprising at least one non-transitory computer-readable storage medium, the non-transitory computer-readable storage medium comprising a set of instructions, which, when executed by one or more processors, cause an apparatus to at least perform:
- determine a plurality of first pixels having resemblance with a second pixel associated with an image based on a depth information of the image, the second pixel being associated with at least one image defect; and
- replace the second pixel by one first pixel of the plurality of first pixels based on a determination that the at least one first pixel is not associated with the at least one of image defect;
- wherein the depth information comprises a depth offset of the at least one first pixel with respect to the second pixel, and wherein the depth offset is associated with at least two micro-lenses of an apparatus.

14. The computer program product as claimed in claim 13, wherein the apparatus is further caused, at least in part to determine the second pixel of a plurality of pixels associated with the image as associated with the at least one image defect.

15. The computer program product as claimed in claim 13, wherein the at least one image defect is associated with at least one of a vignette pixel and a bad pixel in the image.

16. The computer program product as claimed in claim 13, wherein the at least one image defect is associated with at least one of a vignette pixel and a bad pixel in the image, wherein the apparatus is further caused, at least in part to determine the second pixel as being the vignette pixel by performing determination of intensity of pixels appearing at an edge portion of the image.

17. The computer program product as claimed in claim 13, wherein the at least one image defect is associated with at least one of a vignette pixel and a bad pixel in the image, wherein the apparatus is further caused, at least in part to determine the second pixel as being the bad pixel by determining the second pixel as at least one of a stuck high pixel, a stuck low pixel, a hot pixel, a cold pixel, a pixel from a group of bad pixels forming a cluster, and a pixel from a group of bad pixels forming along a row or a column.

18. The method as claimed in claim 1, wherein the plurality of first pixels having resemblance with the second pixel comprise pixels that correspond to a same portion of the image.

19. The method as claimed in claim 1, wherein the plurality of first pixels having resemblance with the second pixel comprise pixels associated with substantially same intensity values.

20. The method as claimed in, claim 1, wherein the depth offset is directly proportional to a distance between the at least two micro-lenses.

* * * * *